(12) United States Patent
Senatori (10) Patent No.: US 9,857,893 B2
(45) Date of Patent: Jan. 2, 2018

(54) TOUCHPAD BAR

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 130 days.

(21) Appl. No.: 14/900,310

(22) PCT Filed: Aug. 31, 2013

(86) PCT No.: PCT/US2013/057742
§ 371 (c)(1),
(2) Date: Dec. 21, 2015

(87) PCT Pub. No.: WO2015/030830
PCT Pub. Date: Mar. 5, 2015

(65) Prior Publication Data
US 2016/0274678 A1    Sep. 22, 2016

(51) Int. Cl.
*G06F 3/039*    (2013.01)
*G06F 1/16*    (2006.01)
*G06F 3/0354*    (2013.01)

(52) U.S. Cl.
CPC ............ *G06F 3/039* (2013.01); *G06F 1/169* (2013.01); *G06F 1/1633* (2013.01); *G06F 3/03547* (2013.01); *G06F 2203/04104* (2013.01)

(58) Field of Classification Search
CPC ..... G06F 1/1633; G06F 1/169; G06F 3/03547
See application file for complete search history.

(56) References Cited

U.S. PATENT DOCUMENTS

| 8,098,233 | B2 | 1/2012 | Hotelling et al. |
| 8,294,675 | B2 * | 10/2012 | Mathew ............... G06F 1/1616 178/18.01 |
| 8,446,372 | B2 | 5/2013 | Locker et al. |
| 2006/0044259 | A1 | 3/2006 | Hotelling et al. |
| 2010/0182263 | A1 * | 7/2010 | Aunio ..................... G06F 3/016 345/173 |
| 2011/0141052 | A1 * | 6/2011 | Bernstein ................ G06F 3/016 345/174 |
| 2012/0103773 | A1 * | 5/2012 | Villain ................ G06F 3/03547 200/344 |
| 2012/0169603 | A1 * | 7/2012 | Peterson ............... G06F 3/0202 345/168 |

(Continued)

FOREIGN PATENT DOCUMENTS

KR    10-2007-0095189    9/2007
TW    I350473    10/2011
(Continued)

*Primary Examiner* — Hoa C Nguyen
*Assistant Examiner* — Keith Depew
(74) *Attorney, Agent, or Firm* — HP Inc Patent Department (57) ABSTRACT

A bar may be connected to a touchpad. The bar may include a first arm connected to a first region of the touchpad. The bar may also include a second arm connected to a second region of the touchpad. A shaft may connect the first and second arm. The bar may control flexure of the touchpad between the first region and the second region.

12 Claims, 5 Drawing Sheets

(56) References Cited

U.S. PATENT DOCUMENTS

| | | | |
|---|---|---|---|
| 2012/0206248 A1* | 8/2012 | Biggs | ............... G06F 3/016 340/407.2 |
| 2012/0268392 A1 | 10/2012 | Kessler | |
| 2013/0050099 A1 | 2/2013 | Hirano et al. | |
| 2015/0243457 A1* | 8/2015 | Niu | ............... H01H 23/12 200/339 |

FOREIGN PATENT DOCUMENTS

| | | |
|---|---|---|
| TW | M435660 | 8/2012 |
| TW | 201322295 A | 6/2013 |

* cited by examiner

TOUCHPAD BAR

BACKGROUND

A touchpad is a human input interface having a tactile sensing surface. The sensing surface may translate the motion or the position of a user's finger into spatial data. For example, this may allow a user to control a pointer or cursor displayed on a computer screen. The sensing surface and associated device drivers may also provide further interface options. For example, some touchpads and associated drivers may interpret tapping the pad as a click action.

Some touchpads allow a user to use multiple fingers to interface with the computer. For example, such a multi-touch touchpad may allow the user to tap the touchpad with two fingers to provide a right click action. As further examples, a user may drag two fingers on the touchpad to scroll within a window or drag three fingers to switch between windows or workspaces.

BRIEF DESCRIPTION OF THE DRAWINGS

Certain examples are described in the following detailed description and in reference to the drawings, in which.

DETAILED DESCRIPTION OF SPECIFIC EXAMPLES

Some touchpads have a switch that allows a user to depress the tactile surface to provide a click action. In some cases, whether the click action is registered as a left or right click action may depend on where the user presses the tactile surface. For example, if the user presses on the left half of the tactile surface, the switch actuation may be registered as a left click action, and if the user presses on the right half, the switch actuation may be registered as a right click action.

A touchpad may have a degree of flexibility. Additionally, as notebooks become thinner, touchpads may be made thinner and lighter, which may increase their flexibility. Accordingly, if the touchpad is sufficiently wide, when a user presses certain locations, such as the left or right front corners, the touchpad may contact a housing before actuating the switch. For example, this may occur if a touchpad is made wider to accommodate multi-finger gestures. Accordingly, in some cases, a user may be unable to perform a click action by pressing on the corners of the touchpad if the touchpad contacts the housing before actuating the switch. Further, even if a user is able to actuate the switch by pressing the front corners, excessive touchpad flexure may create an unsatisfactory user experience.

Some aspects of the disclosed technology may control flexure of a touchpad. In one example, a shaft of a bar is attached to a touchpad assembly housing in a manner allowing the shaft to rotate. In this example, a first arm of the bar is attached to a first front corner of the touchpad and a second arm of the bar is attached to a second corner of the touchpad. When a user presses a region proximal to the first front corner, the bar simultaneously pulls the second corner of the touchpad. This may control flexure of the touchpad by preventing, reducing, or limiting flexure of the touchpad between the corners. This may prevent a corner of the touchpad from contacting a housing prior to actuating a touchpad switch.

Figure 1A:
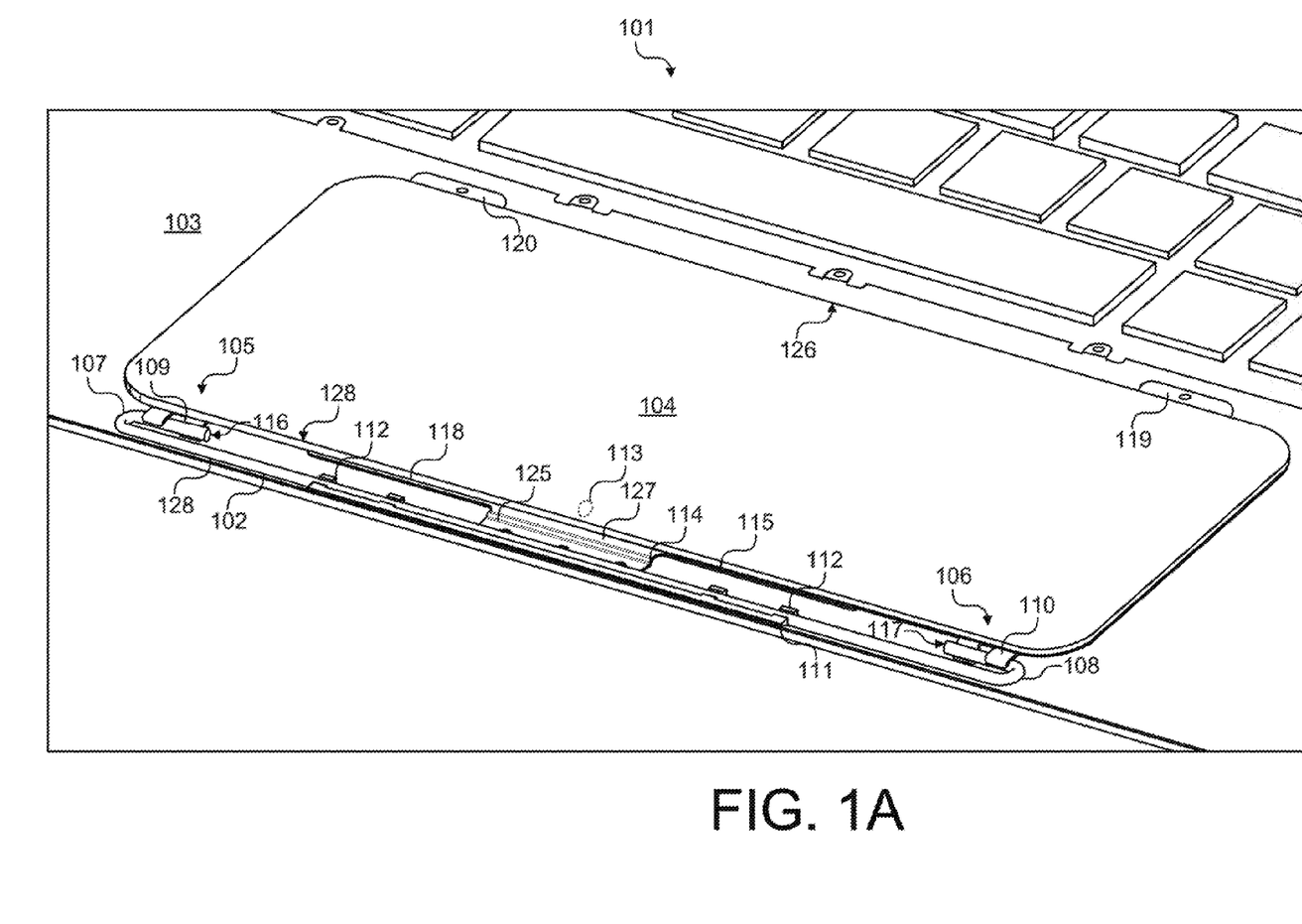
FIG. 1A illustrates an example touchpad assembly having a bar controlling flexure of a touchpad.
Figure 1B:
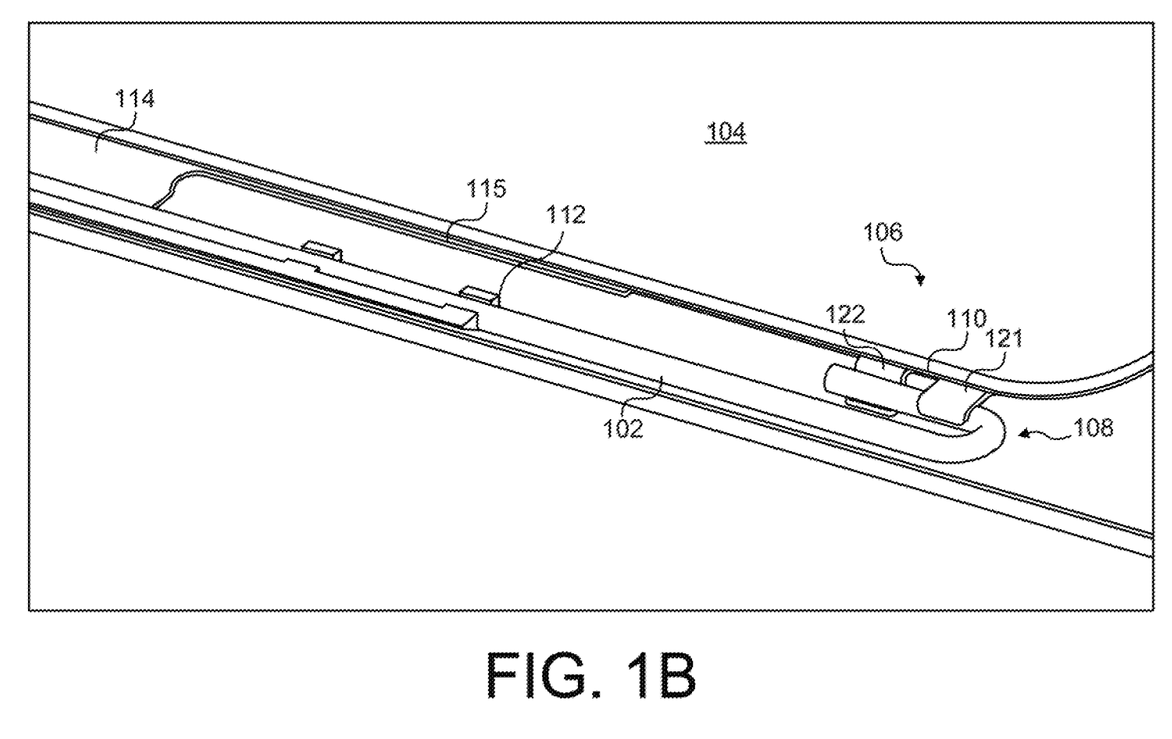
FIG. 1B illustrates a close-up of a portion of the example touchpad assembly of FIG. 1A, showing a connection between the bar and the touchpad.

FIG. 1A illustrates an example touchpad assembly 101 having a bar 102 controlling flexure of a touchpad 104. FIG. 1B illustrates a close-up of a portion of the example touchpad assembly 101, showing an example connection 115 between the touchpad 104 and the bar 102. In some implementations, the touchpad assembly 101 may be a component of a computer. For example, the touchpad assembly 101 may be a component of a notebook computer, such as the example notebook computer 201 of FIG. 2 (described below). In other implementations, the touchpad assembly 101 may be integrated into other devices or may be a standalone peripheral.

The example touchpad assembly 101 includes a touchpad 104. The touchpad 104 may have a tactile sensing surface, such as a capacitive sensing surface. Additionally, the touchpad 104 may be depressed by the user to actuate a switch 113. For example, the touchpad 104 may be coupled to a spring arm 114 at a portion of its bottom edge 128. In some instances, the spring arm 114 may include a touchpad supporting portion 127 coupled to the touchpad 104. The spring arm 114 may be coupled to the housing 103 using a bracket 125. When a user presses the touchpad 104, the spring arm 114 may bend, allowing the touchpad 104 to be depressed by pivoting about the top edge 126. If the touchpad 104 is sufficiently depressed, the switch 113 may be actuated. For example, the switch 113 may be disposed below the touchpad supporting portion 127 and depressed if the spring arm is bent a sufficient amount. When the user releases the touchpad 104, the spring arm 114 may resiliently return the touchpad 104 to its elevated position.

The touchpad 104 may have a degree of flexibility. For example, the touchpad 104 may be made of resilient materials, such as plastics, metals, or thin layers of glass. At a sufficient width, the flexibility of the touchpad 104 may begin to affect the touchpad's 104 user experience. For example, without bar 102, if a user presses a first region 105 or a second region 106, the touchpad 104 may noticeably flex, which may detract from the user experience. As another example, without bar 102, if the user presses the first region 105 or the second region 106, the touchpad 104 may flex enough to allow the touchpad 104 to contact the housing 103 prior to actuating the switch 113.

The touchpad assembly 101 may include a bar 102. The bar 103 may include a first arm 107, a second arm 108, and a shaft 128 connecting the arms 107, 108. The bar 102 may control flexure of the touchpad 104 between a first region 105 and a second region 106. For example, the first region 105 may be a left bottom corner and the second region 106 may be a right bottom corner. When a user presses the touchpad, the bar 102 may distribute force between the first region 105 and the second region 106. This may control flexure of the touchpad 104 by reduce the bending moment between each region 105, 106 and the bracket 125 of the spring arm 114.

The touchpad assembly 101 may include a first coupler 109 coupling the first arm 107 and the first region 105 and a second coupler 110 coupling the second arm 108 and the second region 106. In the illustrated implementation, the first and second couplers 109, 110 are proximal to the first and second regions 105, 106, respectively. In other implementations, the first and second couplers 109, 110 may be located elsewhere. For example, the first coupler 109 and second coupler 110 may be closer to the center line of the touchpad than the first and second regions 105, 106. In such implementations, the bar 102 may be shorter than the distance between the regions 105, 106.

For example, the first coupler 109 and the second coupler 110 may comprise pairs of brackets 121, 122 retaining the first and second arms 107, 108. In some implementations, the first and second couplers 109, 110 may be integral with the spring arm 114. For example, the first coupler 109 may extend from a left arm 118 of the spring arm 114 and the second coupler 110 may extend from a right arm 115 of the spring arm 114. As another example, the first coupler and second couplers 109, 110 may extend from the bottom edge 128 of the touchpad 104.

The touchpad assembly 101 may also include a third coupler 111 coupling the shaft 128 of the bar 102 to the touchpad housing 103. For example, the third coupler 111 may comprise a series of clips 112 retaining the shaft 128. For example, the clips 112 may be bonded to—or integral with—the touchpad housing 103.

In some implementations, the first coupler 109 and second coupler 110 may permit the first arm 107 and second arm 108 to rotate when the touchpad 104 is pressed. Likewise, the third coupler 111 may permit the shaft 128 to rotate when the touchpad 104 is pressed. For example, when a user presses on a bottom left corner of the touchpad 104, the first arm 107 may translate with the bottom left corner and rotate in the first coupler 109. This may create a torque on the shaft 128 that causes the shaft 128 to rotate. In turn, this may simultaneously cause the second arm 108 to translate and rotate in the second coupler 110. This may cause the bottom right corner of the touchpad 104 to be translated simultaneously with the bottom left corner, distributing the downward force between the two corners.

The touchpad assembly 101 may also include a third coupler 119 coupling the touchpad 104 to the touchpad housing 103 at a location distal 126 from the first region 105 and the second region 106. For example, the touchpad 104 may be fixed at its top edge 126 by brackets 119, 120 coupling the top edge to a housing 103. In this example, the touchpad 104 may pivot about the brackets 119, 120 when pressed.

In the illustrated implementation, the arms 107, 108 are directed towards each other such that a first end 116 of the first arm 107 faces towards a second end 117 of the second arm 108. In other implementations, the arms may be in other arrangements. For example, the arms 107, 108 may be directed away from each other such that the first end 116 and the second end 117 face away from each other.

Figure 1C:
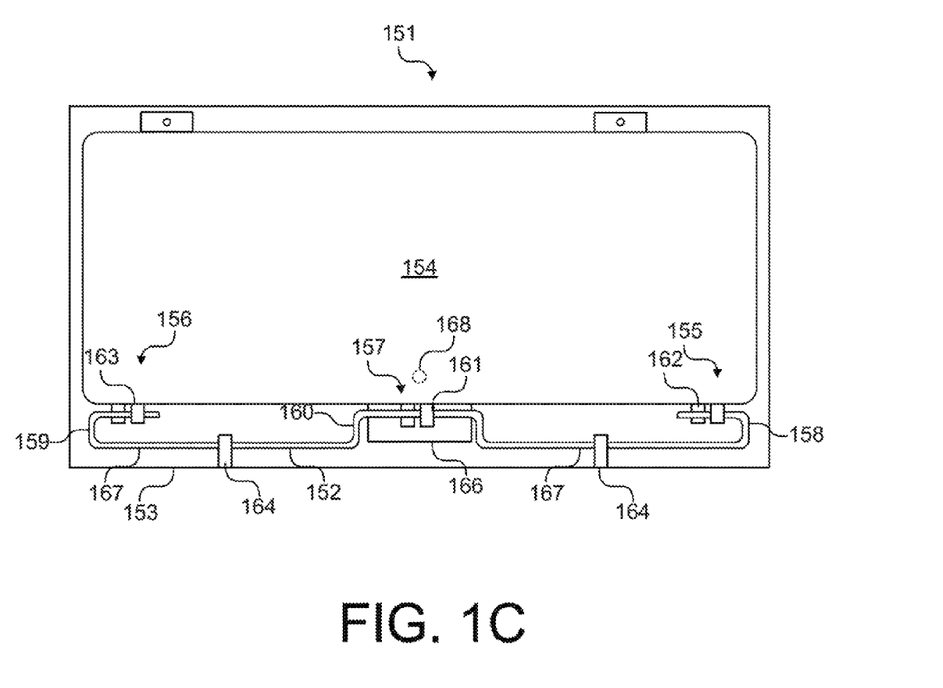
FIG. 1C illustrates an example touchpad assembly having a bar controlling flexure of a touchpad and having three arms.

FIG. 1C illustrates an example touchpad assembly 151 having a bar 152 controlling flexure of a touchpad 154 and having three arms 158, 159, 160. Like the touchpad assembly of FIGS. 1A and 1B, the touchpad 154 may have a tactile sensing surface and may be depressed to actuate a switch 168. For example, a switch 168 may be disposed underneath a spring arm 166 coupling the touchpad 154 to a housing 153. Depressing the touchpad 154 may bend the spring arm 168 and actuate the switch 168.

The example touchpad assembly 151 may also include a bar 152 controlling flexure of the touchpad 154. The bar 152 may include a first arm 158, a second arm 159, a third arm 160, and a shaft 167. In this embodiment, the bar 152 may control flexure of the touchpad 154 between a first region 155 and a second region 156. When a user presses the touchpad, the bar 152 may distribute force between the first region 155, the second region 156, and third region 157. For example, the third region 157 may be proximal to the center of the touchpad 154. In some implementations, the bar 152 having a third arm 160 may be used if distributing depressive force between only the first region 155 and the second region 156 would not sufficiently control flexure to prevent the corners of the touchpad from contacting the housing 153 prior to actuation of the switch 168.

The touchpad assembly 154 may also include: a first coupler 162 coupling the first arm 158 and the first region 155; a second coupler 163 coupling the second arm 159 and a second region 156; and a third coupler 161 coupling the third arm 160 and the third region 157. In the illustrated embodiment, the couplers 162, 163,161 are proximal to the regions 155, 156, 157, respectively. In some implementations, the couplers 162, 163, 161 may be integral with the spring arm 166.

The touchpad assembly 151 may also include a fourth coupler 164 coupling the shaft 167 of the bar 152 to the touchpad housing 153. For example, the fourth coupler 164 may comprise a series of clips 164 retaining the shaft 164. In some implementations, the clips 164 may be bonded to—or integral with—the touchpad housing 153.

In some implementations, the couplers 162, 163, 161 may permit the respective arms 158, 159, 160 to rotate when the touchpad 154 is pressed. Likewise, the fourth coupler 164 may permit the shaft 167 to rotate when pressed. In this arrangement, when a user presses the touchpad 154, the three regions 156, 157, 155 may be translated simultaneously.

Figure 2:
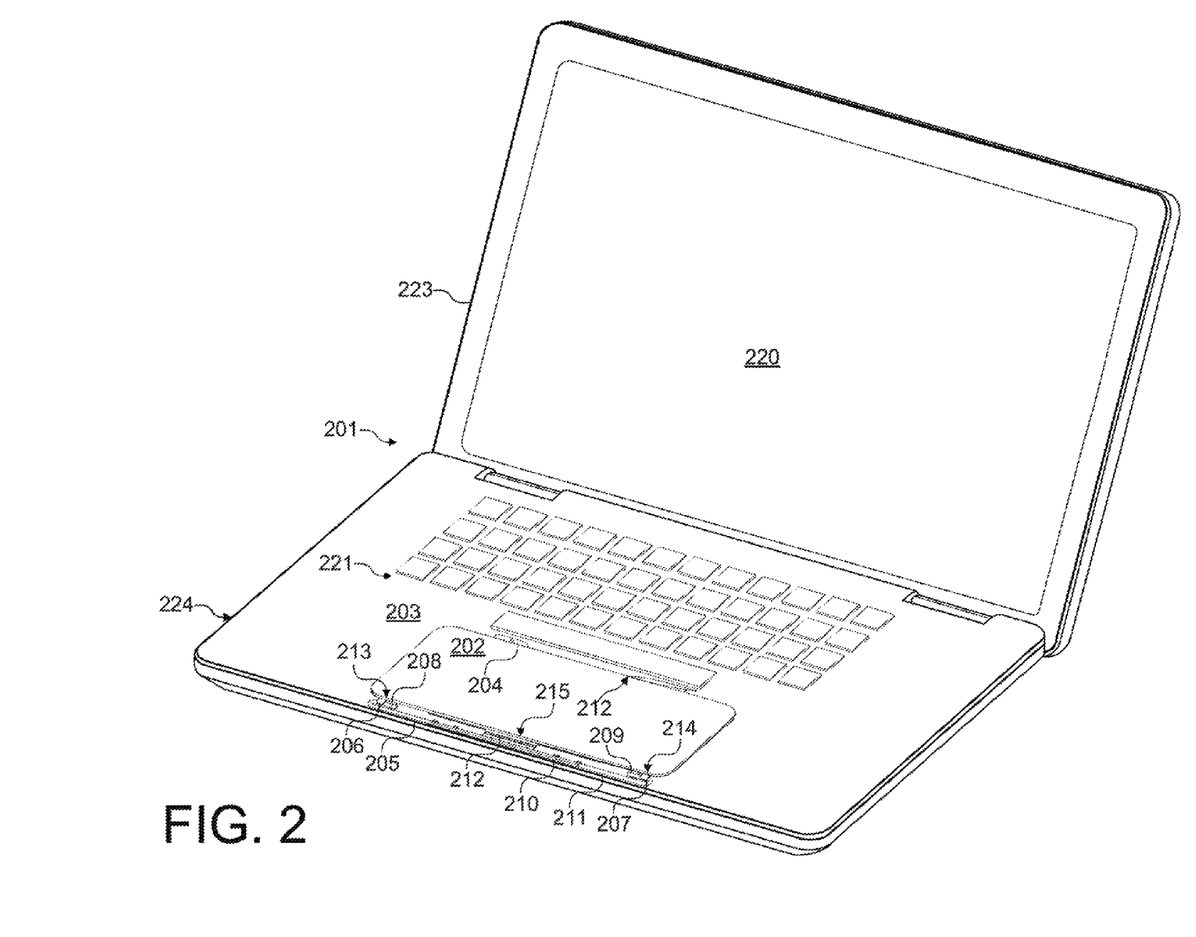
FIG. 2 illustrates an example computer having a touchpad and a bar controlling flexure of the touchpad.

FIG. 2 illustrates an example computer 201 having a touchpad 202 and a bar 205 controlling flexure of the touchpad 202. For example, the touchpad 202 and bar 205 may be similar to the corresponding components of the touchpad assembly of FIGS. 1A and 1B. The example computer 201 may be a clamshell-type notebook computer, including a display 220 in a display housing and a keyboard 221. In other implementations, the computer 201 may have other form factors.

In this example, the touchpad 202 is located in front of the keyboard 221. For example, the touchpad 202 may be located in a palm rest region of the notebook 201. The example touchpad 202 includes a bracket 204 at a first edge 212 of the touchpad 202. For example, the bracket 204 may be located at the back edge of the touchpad 202. The example computer 201 includes a housing 203 coupled to the bracket 204. For example, the housing 203 may be part of a case for the computer 201 or an internal housing for mounting the touchpad 202. In some implementations, the housing 203 may be composed of multiple housing parts. For example, the housing 203 connected to the bracket 204 may be disjoint from the housing 203 connected to the shaft 211 of the bar 205. In some implementations, a case (not pictured) covers to the housing 203 such that only the tactile sensing surface of the touchpad 202 and keys of the keyboard 221 are visible to a user.

The bar 205 may control flexure of the touchpad 202 at a second edge 215, such as the front edge of the touchpad 202. The bar 205 may include a first arm 208, a second arm 209, and a shaft 211 connecting the first and second arms. The bar 205 may be held in place by a number of clips. For example, a first clip 206 may connect a first location 213 of the second edge 215 of the touchpad 202 to the first arm 208. For example, the first clip 206 may connect a first corner of the touchpad 202 to the first arm 208. A second clip 207 may connect a second location 214 214 of the second edge 215 to the second arm 209. For example, the second clip 207 may connect a second corner of the touchpad 202 to the second arm 209. A third clip 210 may connect the shaft 211 to the housing 203.

In some implementations, the dips 206, 207 are parts of a spring arm 212. The spring arm 212 may be coupled to the touchpad 201 at the first and second location 213, 214. As described with respect to FIGS. 1A and 1B, a switch may be disposed under the spring arm 212. In such implementations, the switch may be actuated by bending the spring arm 212 a sufficient amount.

In some implementations, the first arm 208 is rotatable in the first clip 206, the second arm 209 is rotatable in the second clip 207, and the shaft 211 is rotatable in the third clip 210. In further implementations, when a user presses the first location 213 of the touchpad 204, the second location 214 of the touchpad 204 is pulled. For example, when the first location 213 is pressed, the first arm 208 may exert a torque on the shaft 211, causing the second arm 209 to rotate about the axis of the shaft 211, pulling the second location 214 in the same direction as the first location 213. In some implementations, this may prevent the first location 213 from twisting with respect to the second location 214.

In the illustrated implementation, similar to bar 102 (FIG. 1), the first and second arms 208, 209 are directed towards the center of the shaft 211. In other implementations, the first arm 208 and the second arm 209 may be directed away from the center of the shaft 211.

Figure 3:
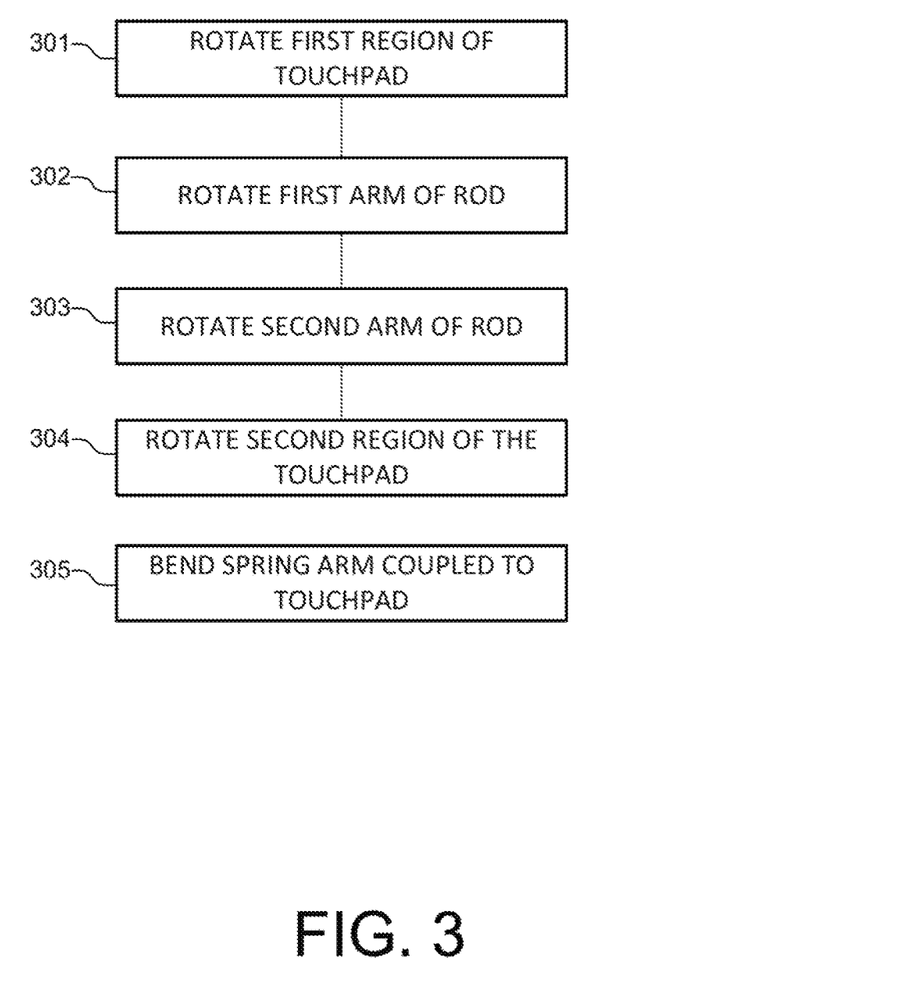
FIG. 3 illustrates a method of operation of a touchpad connected to a bar.

FIG. 3 illustrates an example method of operation of a touchpad connected to a bar. For example, the touchpad assembly 101 of FIGS. 1A and 1B or the touchpad 202 and bar 211 of FIG. 2 may be operated in accordance with the Illustrated method. In this example, the illustrated steps 301-305 may occur simultaneously.

The example method includes a step 301 of rotating a first region of a touchpad about a pivot. For example, a user may depress a touchpad to perform a click action, causing the first region to rotate about the pivot. In some implementations, the pivot may be located proximal to an edge of the touchpad and the first region may be a first corner opposite the edge. For example, a user operating touchpad 104 of FIGS. 1A and 1B may press the touchpad, causing region 105 to rotate about a pivot created by the brackets 119, 120.

By performing step 301, a step 302 of rotating a first arm of a bar may be performed. For example, rotating the first region 105 about the pivot may cause the first arm 107 to rotate about the axis of the shaft 128.

By performing step 302, a step 303 of rotating a second arm of the bar may be performed. For example, rotating the first arm 107 may cause the shaft 128 to rotate, which may cause the second arm 108 to rotate about the axis of the shaft.

By performing step 303, a step 304 of rotating a second region of the touchpad about the pivot may be performed. In some implementations, the second region may be a second corner opposite the edge of the touchpad. For example, the second arm 108 of the bar 102 may be coupled to the second region 106 of the touchpad 104. Rotation of the second arm 108 by the shaft 128 may cause the second region 106 to rotate about the pivot created by the brackets 119, 120.

In some implementations, rotating the first and second region may perform the step 305 of bending a spring arm coupled to the touchpad. For example, rotating the first region 105 and the second region 106 may bend the spring arm 114. Additionally, if the spring arm is sufficiently bent, a switch, such as switch 113, may be actuated.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A touchpad assembly, comprising:
 a bar controlling flexure of a touchpad between a first region and a second region, the bar comprising a first arm comprising a first end, a second arm comprising a second end, and a shaft connecting the first arm and the second arm, wherein the first end faces towards the second end;
 a first coupler coupling the first arm and the first region; and
 a second coupler coupling the second arm and the second region.

2. The touchpad assembly of claim 1, further comprising:
 a spring arm coupled to the touchpad and a touchpad housing, the spring arm comprising the first coupler and the second coupler.

3. The touchpad assembly of claim 1, further comprising:
 a third coupler coupling the shaft to a touchpad housing.

4. The touchpad assembly of claim 3, wherein:
 the first coupler permits the first arm to rotate when the touchpad is pressed;
 the second coupler permits the second arm to rotate when the touchpad is pressed; and
 the third coupler permits the shaft to rotate when the touchpad is pressed.

5. The touchpad assembly of claim 1, further comprising:
 a third coupler coupling the touchpad to a touchpad housing at a location distal from the first region and the second region; and
 wherein the touchpad pivots about the third coupler when pressed.

6. The touchpad assembly of claim 1, wherein the bar further comprises a third arm, and further comprising a third coupler coupling the third arm and a third region of the touchpad.

7. A system, comprising:
 a touchpad;
 a housing coupled to a bracket at a first edge of the touchpad;
 a bar controlling flexure of the touchpad at a second edge, the bar comprising a first arm, a second arm, and a shaft connecting the first arm and the second arm;
 a first clip connecting a first location of the second edge to the first arm, wherein the first arm is rotatable in the first clip;
 a second clip connecting a second location of the second edge to the second arm, wherein the second arm is rotatable in the second clip; and
 a third clip connecting the shaft to the housing, wherein the shaft is rotatable in the third clip.

8. The system of claim 7, further comprising:
 a spring arm coupled to the touchpad at the first location and the second location, the spring arm comprising the first clip and the second clip.

9. The system of claim 7, wherein the first arm pulls the first location when the second location is pressed.

10. The system of claim 7, wherein the bar prevents the first location from twisting with respect to the second location.

11. The system of claim 7, wherein:
the first arm and the second arm are directed towards a center of the shaft.

12. A notebook, comprising
a screen housed in a first housing;
a keyboard coupled to a second housing;
a touchpad coupled to the second housing and located in front of the keyboard;
a bar coupled to the touchpad at a plurality of regions, the bar controlling flexure of the touchpad by causing the plurality of regions to simultaneously translate when the touchpad is depressed, wherein the bar comprises:
   a first arm coupled to the touchpad at a first region;
   a second arm coupled to the touchpad at a second region;
   a third arm coupled to the touchpad at a third region; and
   a shaft coupled to the housing.

* * * * *